United States Patent [19]

Kawada

[11] Patent Number: 4,997,065

[45] Date of Patent: Mar. 5, 1991

[54] MECHANISM FOR AUTOMATICALLY PREVENTING A MOTOR VEHICLE FROM DROPPING FROM A WHEELS SUPPORT PLATE OF A SYSTEM FOR LIFTING THE VEHICLE FOR REPAIR THEREOF

[75] Inventor: Hiroyuki Kawada, Hekinan, Japan

[73] Assignee: Sugiyasu Industries Co., Ltd., Takayama, Japan

[21] Appl. No.: 392,706

[22] Filed: Aug. 11, 1989

[30] Foreign Application Priority Data

Nov. 26, 1988 [JP] Japan ................................ 63-153673

[51] Int. Cl.[5] ................................................ B60S 13/00

[52] U.S. Cl. .................................. 187/8.52; 187/8.71; 254/122; 182/141

[58] Field of Search ..................... 187/8.41, 8.43, 8.52, 187/8.47, 8.65, 8.74, 8.77, 8.71, 8.72, 8.75, 18, 9 R; 254/122, 89 R, 89 H; 182/141

[56] References Cited

U.S. PATENT DOCUMENTS

| | | | |
|---|---|---|---|
| 2,098,376 | 11/1937 | Cunneen | 187/97 |
| 3,048,238 | 8/1962 | Wallace | 187/8.52 |
| 3,375,905 | 4/1968 | Swick, Jr. | 187/8.74 |
| 3,532,185 | 6/1968 | Sherry | 187/8.52 |

*Primary Examiner*—H. Grant Skaggs
*Assistant Examiner*—Kenneth Noland
*Attorney, Agent, or Firm*—Lahive & Cockfield

[57] ABSTRACT

A mechanism for automatically preventing a motor vehicle from dropping from a wheels support plate of a lifting apparatus of a system for lifting the vehicle for repair thereof comprises (i) a barrier wall connected to one end portion of the support plate along a width direction thereof for pivotal movement between a vertical position and a horizontal position which is on the support plate, (b) positioner for maintaining the barrier wall in the vertical position when the support plate is not in a lowest position, so that if a motor vehicle driven onto the support plate from a direction opposite to said one end portion of the support plate and supported thereon should accidentally move forward, the barrier wall engages a front wheel of the vehicle to prevent the vehicle from dropping from said one end portion of the support plate, and (c) leveler which brings the barrier wall down to the horizontal position when the support plate has been moved to a lowest position. According to one aspect of the invention, the positioner comprises a first urging device for urging the barrier wall downwardly at all times except when the support plate is in the lowest position, and the leveler comprises a second urging device for urging the barrier wall upwardly against the action of the first urging device to allow the barrier wall to rotate to the horizontal position when the support plate has been moved to the lowest position.

3 Claims, 3 Drawing Sheets

MECHANISM FOR AUTOMATICALLY PREVENTING A MOTOR VEHICLE FROM DROPPING FROM A WHEELS SUPPORT PLATE OF A SYSTEM FOR LIFTING THE VEHICLE FOR REPAIR THEREOF

FIELD OF THE INVENTION

This invention relates to a mechanism for automatically preventing a motor vehicle from dropping from a wheels support plate of a system for lifting the vehicle for repair thereof.

BACKGROUND OF THE INVENTION

Usually there is almost no possibility that a motor vehicle supported on wheels support plates of a lift system may drop therefrom, provided that the vehicle has been located correctly in a safe position on the support plates. However, if, for example, one fails to apply the brakes before lifting up a motor vehicle on the support plates, the vehicle may move forward on the support plate and drop from the rear end thereof when the vehicle is being lifted up or when the vehicle is in a lifted position. Conventionally such a danger has been eliminated by placing inverted 'V-shaped wheel stoppers on the support plates, before lifting a motor vehicle up, such that the stoppers engage the wheels of the vehicle. This method of preventing the vehicle dropping from the support plates is troublesome, however, since it is necessary to remove the stoppers from the support plate when the lift system is not used and to place the stoppers in the necessary positions on the support plates which are different with different vehicles. In addition, both the placement of the stoppers on the support plate and the removal of the stoppers therefrom are manual works.

SUMMARY OF THE INVENTION

Accordingly, it is an object of the invention to provide a mechanism for automatically preventing a motor vehicle dropping from a wheels support plate of a lifting apparatus of a system for lifting the vehicle for repair thereof.

To be exact, according to the invention, such a preventing mechanism is provided which comprises (a) a barrier wall connected to one end portion of the support plate along a width direction thereof for pivotal movement between a vertical position and a horizontal position which is on the support plate, (b) positioning means for maintaining the barrier wall in the vertical position when the support plate is not in a lowest position, so that if a motor vehicle driven onto the support plate from a direction opposite to said one end portion of the support plate and supported thereon should accidentally move forward, the barrier wall engages a front wheel of the vehicle to prevent the vehicle from dropping from said one end portion of the support plate, and (c) leveling means which brings the barrier wall down to the horizontal position when the support plate has been moved to a lowest position.

According to one aspect of the invention, the positioning means comprises a first urging means for urging the barrier wall downwardly at all times except when the support plate is in the lowest position, and the leveling means comprises a second urging means for urging the barrier wall upwardly against the action of the first urging means to allow the barrier wall to rotate to the horizontal position when the support plate has been moved to the lowest position.

The first urging means may comprise a coil spring, while the second urging means may comprise a push member.

The push member may be vertically movably disposed in a guide means fixed to the support plate so that when the support plate has been moved to the lowest position, upon engaging a base of the lifting apparatus the push member moves upwardly to urge the barrier wall upwardly. Alternatively, the push member may be fixed on a base of the lifting apparatus.

The second urging means may further include a roller coupled to the barrier wall and pushed up by the push member to urge the barrier wall upwardly.

If the push member is disposed in the guide means, the push member may be so located that its top is in engagement with the roller at all times.

Whether the push member is disposed in the guide means or is fixed on the base of the lifting apparatus, the push member pushes the roller up to urge the barrier wall upwardly when the support plate has been moved to the lowest position. The barrier wall is thus brought down, or rotated, to the horizontal position.

BRIEF DESCRIPTION OF THE DRAWING

In FIG. 1 the entire lift system is fully extended;

In FIG. 2 lower link mechanisms of the lifting apparatus are not fully extended, but are half retracted;

In FIG. 3(*b*) the barrier is in the horizontal position;

In FIG. 4 the lower link mechanisms of the lifting apparatus are not fully extended, but are half retracted, likewise in FIG. 2.

DETAILED DESCRIPTION OF THE INVENTION

Figure 1:
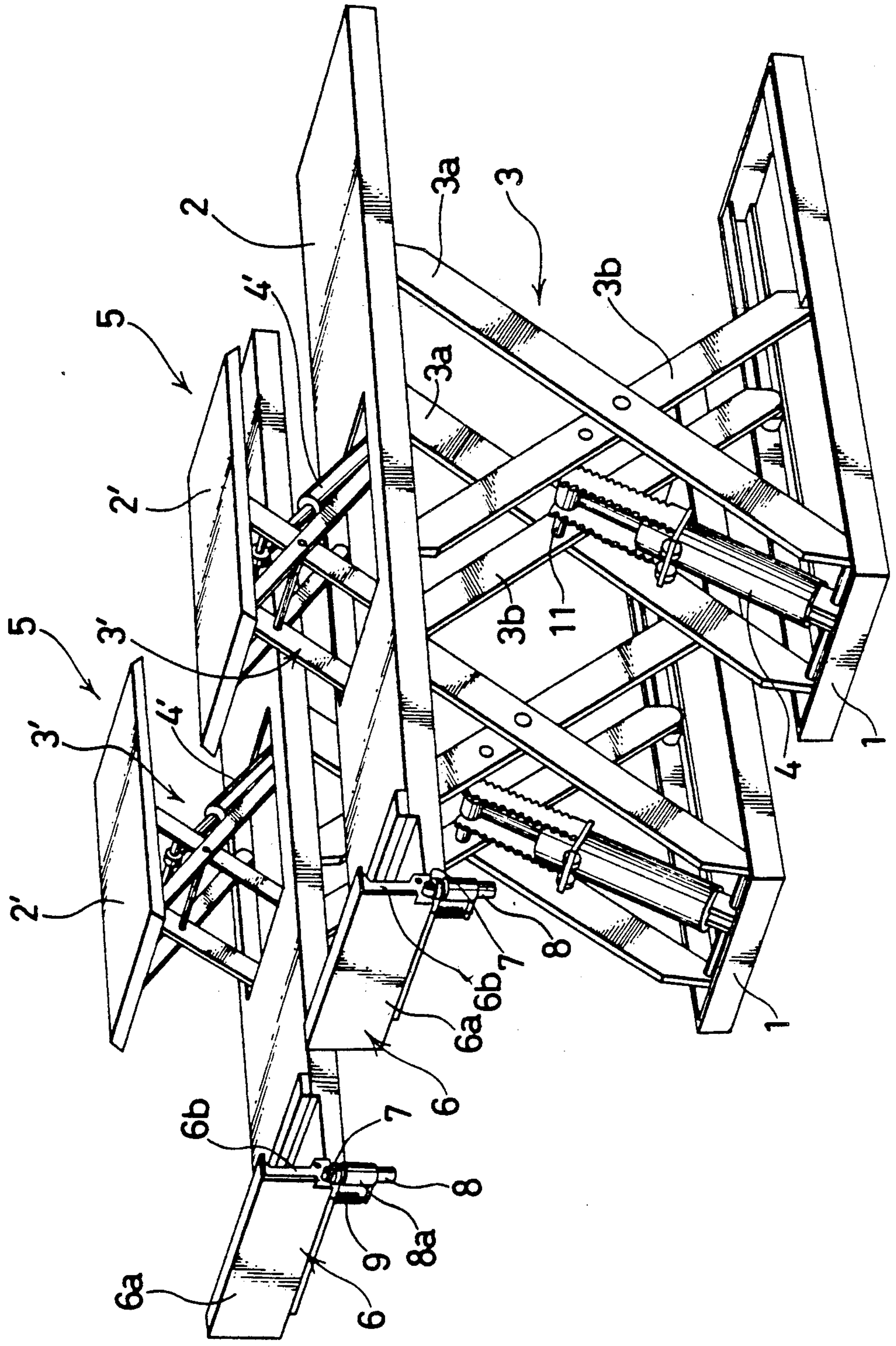
FIG. 1 is a perspective view of a lift system comprising a pair of lifting apparatuses which each have a mechanism for automatically preventing a motor vehicle from dropping from a wheels support plate of the lifting apparatus.
Figure 2:
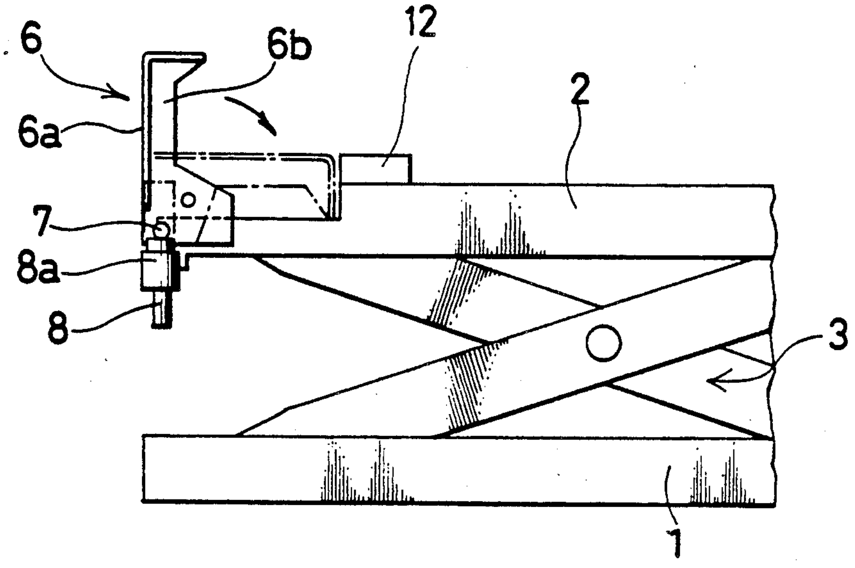
FIG. 2 shows a portion of one of the lifting apparatuses which is provided with the preventing mechanism of the invention. A barrier, which is a major component of the preventing mechanism of the invention, is capable of pivotal motion between a vertical position as indicated by a solid line and a horizontal position as indicated.

With reference to the drawing, description will now be made of a mechanism for automatically preventing a motor vehicle from dropping from a wheels support plate which embodies the invention in a preferred form. FIG. 1 depicts an entire system for lifting a motor vehicle for repair which comprises a pair of juxtaposed lifting apparatuses each having the preventing mechanism of the invention. The two lifting apparatuses are operated synchronously to lift a motor vehicle with four wheels together. The two lifting apparatuses are identical with each other in both construction and function. Thus only one of them will be described.

The lifting apparatus includes a base frame 1 and a wheels support plate 2. The base frame 1 and the support plate 2 are connected to each other by a pair of parallel vertically-extensible link mechanisms 3. Each link mechanism 3 includes an outer link 3*a* and an inner link 3*b* pivotally connected to each other, at middle portions thereof, to form the alphabetical letter "X". The outer link 3*a* has a lower, or left-hand end pivotally connected to the base frame 1, and has an upper, or righthand end connected to the support plate 2 for sliding movement along a side wall thereof. The inner link 3*b* has an upper, or left-hand end pivotally connected to the support plate 2, and has a lower, or right-hand end connected to the base frame 1 for sliding movement along a side wall thereof.

A hydraulic cylinder 4 is located between the two link mechanisms 3. The cylinder 4 has a lower end connected to the pivot which mounts the lower ends of the outer links 3*a*. Also, the cylinder 4 has a piston rod with an upper end connected to a pivot 11 which connects the inner links 3*b*. Thus, when the piston rod of the cylinder 4 is extended or retracted, the two link mechanisms 3 are extended or retracted synchronously.

The wheels support plate 2 has a central opening. A vertically-extensible jack 5 is provided in the opening. The jack 5 includes a pair of link mechanisms 3' and a vehicle-body support plate 2' supported thereon. Each link mechanism 3' is similar to the lower, larger link mechanism 3 in both construction and function, except that the link mechanism 3' serves not to support the wheels of a motor vehicle, but to support the bottom of the body thereof. The link mechanisms 3' are extended and retracted synchronously from and into the foregoing opening by a hydraulic cylinder 4'.

A transverse preliminary stopper 12 is located in proximity to a rear end of the wheels support plate 2. The preliminary stopper 12 has a top higher than the major upper surface of the support plate 2. The portion of the support plate 2 behind the preliminary stopper 12 has a smaller height than the other portion thereof, thus providing a depression for receiving a barrier 6 when the barrier is brought down as hereinafter described.

The barrier 6 is connected to the rear end of the support plate 2 for pivotal movement between a vertical position and a horizontal position. To be more exact, the barrier 6 is hinged to the rear edge of the upper surface of the depressed portion of the support plate 2. The barrier 6 has an inverted L-shaped wall 6*a* and opposed side walls 6*b* projecting from the inside of the wall 6*a* toward the preliminary stopper 12 at positions near to the right-hand and left-hand ends of the wall 6*a*, respectively. The side walls 6*b* have part of the depressed portion of the support plate 2 between them. The wall 6*a* has a lower end portion which is lower than the upper surface of the depressed portion of the support plate 2. Thus the lower end portion of the wall 6*a* is in engagement with the rear wall of the depressed portion of the support plate 2 when the barrier is in a vertical position (FIG. 3(*a*)).

When the barrier 6 is in the vertical position, the barrier 6 has such a height that the wheels of a motor vehicle supported on the support plate 2 are unable to climb over the barrier 6 if the motor vehicle should accidentally move forward on the support plate 2.

Figure 3A:
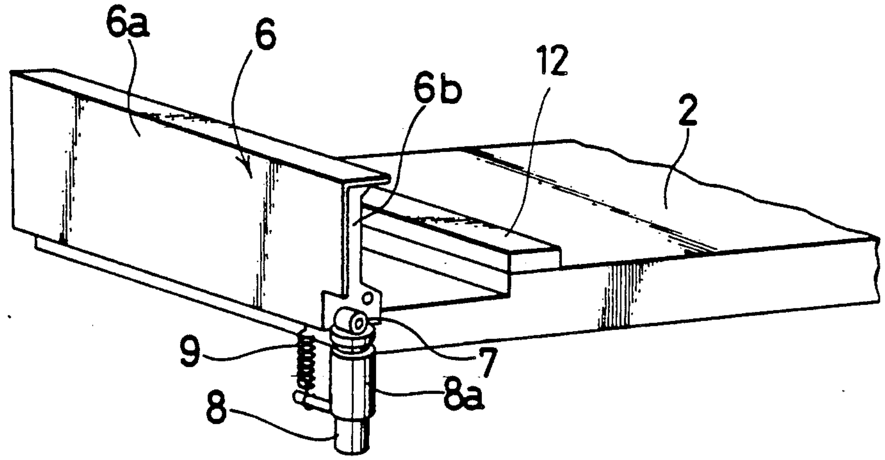
In FIG. 3(*a*) the barrier is in the vertical position. When in this position, the barrier engages a front wheel of a motor vehicle on the wheels support plate if the vehicle should accidentally move forward on the wheels support plate, thus prevent the vehicle from dropping therefrom.

One of the side walls 6*b* of the barrier 6 has a short horizontal arm projecting outwardly therefrom. A roller 7 is mounted on the short arm. A rod 8 is vertically movably disposed in a cylindrical guide 8*a* fixed to the support plate 2, and projects from the cylindrical guide 8*a* at its top and bottom. The top of the rod 8 is in engagement with the roller 7. Also, the top of the rod 8 has such a diameter that it may engage the top of the guide 8*a* and, hence, prevents the rod 8 from falling out of the guide 8*a*. A horizontal member is connected to the guide 8*a*, and is located below the bottom of the barrier 6. A coil spring 9 is connected to the bottom of the barrier 6 at an upper end thereof and connected to the horizontal member at a lower end thereof, and urges the barrier 6 downwardly (FIG. 3*a*). Therefore, the barrier 6 is maintained in the vertical position as long as the barrier 6 is not urged upwardly by the rod 8 as described below.

To drive a motor vehicle onto the lift system, the entire lift system is completely retracted. When the lift system is in its completely retracted position, the rod 8 is in engagement with the base frame 1 while pushing the roller 7 up to maintain the barrier 6 in the horizontal position on the support plate 2. The motor vehicle is driven from the direction opposite to the barrier 6 until a front wheel of the vehicle has come either to a certain position in front of the preliminary stopper 12 or to a position where the front vehicle engages the preliminary stopper 12. The front and rear wheels of the vehicle are now supported on the support plate 2 with the retracted jack 5 between. Thence, the lower link mechanisms 3 are extended to a necessary height. At the same time that the lower link mechanisms 3 start to be extended, the rod 8 is lifted out of engagement of the base frame 1 and, hence, moves downwardly by gravity. Thus, the roller 7 is no longer pushed up by the rod 8. In other words, the barrier 6 is no longer urged upwardly. Hence the barrier 6 is sprung to the vertical position by the coil spring 9. Thus, at the same time that the lower link mechanisms 3 start to be extended, the barrier 6 is automatically so positioned as to prevent the vehicle on the support plate 2 from dropping from the rear end of the support plate 2, since the barrier 6 engages the front wheel of the vehicle if the vehicle accidentally moves forward on the support plate 2 due to, for example, the failure to apply the brakes. Therefore the vehicle is lifted safely. After the lower link mechanisms 3 have been extended to the necessary height, the vehicle may be ready for a necessary repair work. Or, if necessary, e.g., for the replacement of the tires, the jack 5 is thereafter extended from the central opening of the support plate 2 to lift the body of the vehicle so that the wheels of the vehicle are lifted out of contact with the support plate 2. If the vehicle is repaired with its wheels on the support plate 2, thanks to the barrier 6 maintained in the vertical position the vehicle is supported safely thereon without any possibility of its dropping from the rear end of the support plate 2.

Figure 3B:
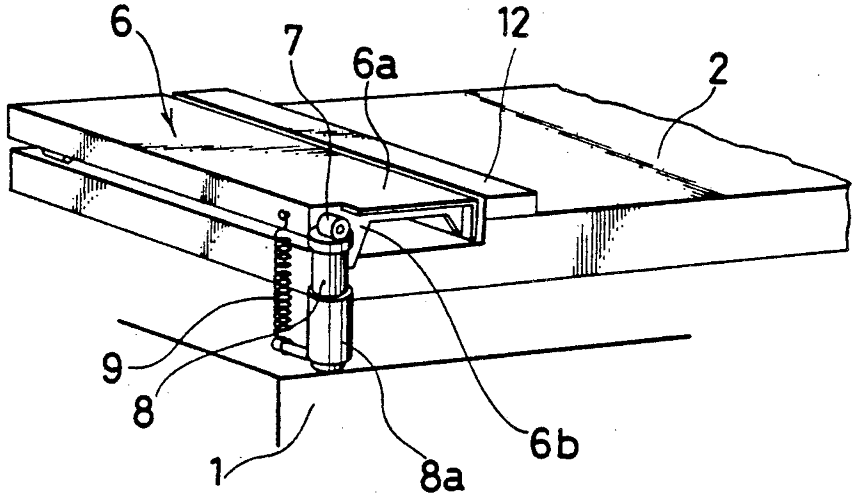

When the vehicle has been repaired, the lift system is retracted. Hence, the rod 8 engages the base frame 1 again and, thus, moves upwardly to push the roller 7 up. Thus, the lower end portion of the wall 6*a* of the barrier 6 is lifted up. In other words, the whole barrier 6 is urged upwardly. Hence the barrier 6 is brought down, or rotated, to the horizontal position on the support plate 2 against the action of the coil spring 9 again. When the barrier 6 is in the horizontal position, the barrier 6 is flush with the preliminary stopper 12 as shown in FIG. 3(*b*). Thus, when the lift system is not in use as it is in the retracted position, it provides a relatively free space on the support plate 2. In contrast with this, if a preventing mechanism with a barrier fixed in an upright position instead of with the movable barrier 6 of the invention is used, there is a danger of, for example, repairmen tripping against the barrier when the lift system is not in use.

Figure 4:
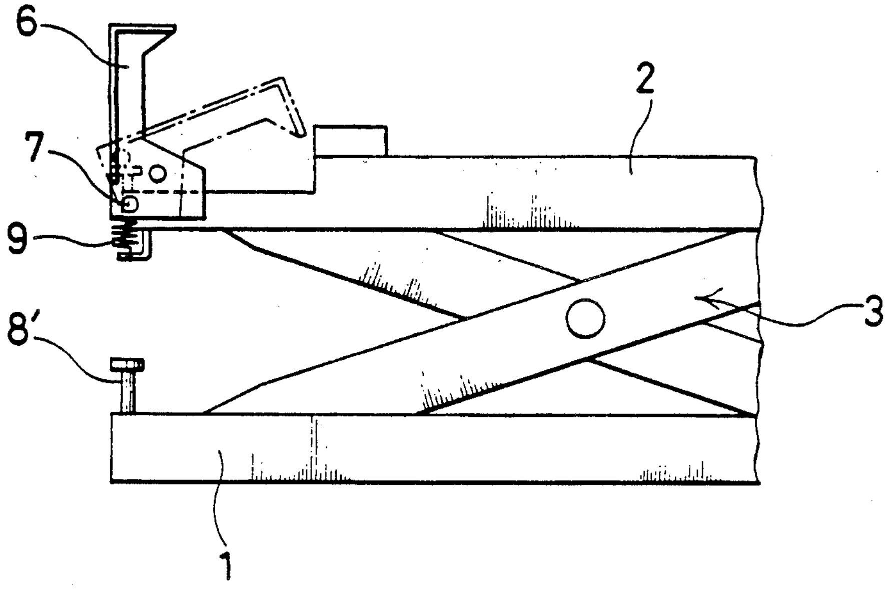
FIG. 4 shows a modification of the preventing mechanism of FIGS. 1 to 3(*b*).

The foregoing preventing mechanism of the invention may be modified by omitting the rod 8 and the cylindrical guide 8*a* and instead fixing a push means 8' equivalent to the rod 8 on the base frame 1 as shown in FIG. 4. In such a modification the push means 8' is so located as to engage the roller 7 when the link mechanisms 3 are retracted to their lowest positions. In this modification, as illustrated, the lower end of the coil spring 9 may be connected to an L-shaped member projecting from the bottom of the support plate 2.

Figure 5:
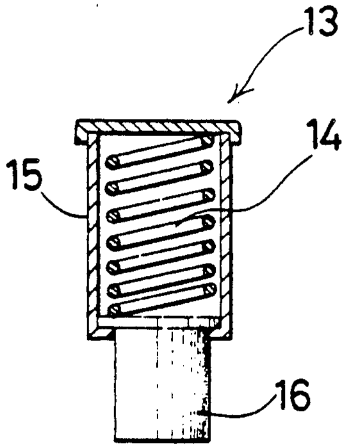
FIG. 5 shows a coil spring which may be provided for a rod used to bring the barrier down to the horizontal position.

If the vehicle supported on the support plate 2 should accidentally move forward and engage the barrier 6 at its front wheel, the barrier 6 certainly prevents the vehicle from dropping from the rear end of the support plate 2 since, as mentioned before, when the barrier 6 is in its vertical position the barrier 6 has such a height that the wheels of the vehicle on the support plate are unable to climb over the barrier 6. In this case it is natural that the vehicle should be lifted down immediately. However, in this case, there is no other way than to lift it down as the front wheel of it is in engagement with the barrier. Thus, when it has been lifted down, the front wheel is in engagement with the barrier. When it has been lifted down, the movable rod 8 or the fixed rod 8' urges the barrier upwardly and, hence, urges the barrier down toward the horizontal position on the support plate 2, but the barrier naturally engages the front wheel with a greater force instead of being brought down to the horizontal position. It may result in damaging the tire. However, this drawback may be eliminated or mitigated if the rod 8 or 8' is replaced with a construction 13 of FIG. 5 comprising a rod 16 with a top located in a housing 15 and a coil spring 14 which is provided within the housing 15 and located on the top of the rod 16 and is so prepared as to be compressed only to a relatively small degree by the rod. If such a construction is used, the roller 7 is urged upwardly only to a relatively small degree since the coil spring 14 no longer transmits the pressure of the rod 16 to the roller 7 after the coil spring 14 has reached the limit of compression. However, if such construction is used, it is natural that the barrier may not be brought down to the horizontal position.

What is claimed is:

1. A mechanism for automatically preventing a motor vehicle from dropping from a wheels support plate of a lifting apparatus of a system for lifting the vehicle for repair, comprising (a) a barrier wall connected to one end portion of the support plate along a width direction thereof for pivotal movement between a vertical position and a horizontal position which is on the support plate, (b) positioning means for urging the barrier wall to the vertical position when the support plate is not in a lowest position, so that if a motor vehicle driven onto the support plate from a direction opposite to said one end portion of the support plate and supported thereon should accidentally move forward, the barrier wall engages a front wheel of the vehicle to prevent the vehicle from dropping from said one end portion of the support plate, the positioning means having one end connected to a bottom of the barrier wall and an opposed end coupled to a guide means fixed to the support plate, and (c) leveling means vertically movably disposed in the guide means so that when the support plate has been moved to the lowest position, upon engaging a base of the lifting apparatus the leveling means moves upwardly to bring the barrier wall down to the horizontal position against the action of the positioning means.

2. A mechanism in accordance with claim 1 which further includes a roller coupled to the barrier wall and wherein the leveling means has a top which is in engagement with the roller at all times, and upon moving upwardly the leveling means pushes the roller up to bring the barrier wall down to the horizontal position.

3. A mechanism in accordance with claim 1 wherein the positioning means comprises a coil spring.

* * * * *